United States Patent [19]

Bernhardt

[11] Patent Number: 5,071,550
[45] Date of Patent: Dec. 10, 1991

[54] APPARTUS FOR CLEANING AND AERATION OF OPEN BODIES OF WATER

[75] Inventor: Bruno Bernhardt, Reutlingen, Fed. Rep. of Germany

[73] Assignee: IEG Industrie-Engineering GmbH, Reutlingen, Fed. Rep. of Germany

[21] Appl. No.: 581,035

[22] Filed: Sep. 12, 1990

[30] Foreign Application Priority Data

Sep. 22, 1989 [DE] Fed. Rep. of Germany ....... 3931617

[51] Int. Cl.$^5$ .......................... B01D 29/00; C10J 1/08
[52] U.S. Cl. ................................. 210/242.2; 210/406; 210/416.1; 261/5; 261/120; 261/123
[58] Field of Search .................. 210/242.2, 406, 416.1; 261/5, 120, 123

[56] References Cited

U.S. PATENT DOCUMENTS

| 3,135,466 | 6/1964 | Reid | 261/DIG. 79 |
|---|---|---|---|
| 3,521,864 | 7/1970 | Welles | 210/242.2 |
| 3,552,725 | 1/1971 | Ray | 210/242.2 |
| 3,642,452 | 2/1972 | Roget et al. | 261/123 |
| 3,653,641 | 4/1972 | Eron | 210/242.2 |
| 3,864,437 | 2/1975 | Blaszkowski | 261/120 |
| 3,998,389 | 12/1976 | Rose et al. | 261/120 |
| 4,030,859 | 6/1977 | Henegar | 210/242.2 |
| 4,468,358 | 8/1984 | Haegeman | 261/120 |
| 4,681,711 | 7/1987 | Eaton | 210/242.2 |

FOREIGN PATENT DOCUMENTS

| 2734629 | 2/1979 | Fed. Rep. of Germany | 261/120 |
|---|---|---|---|
| 2844039 | 4/1980 | Fed. Rep. of Germany | 210/242.2 |
| 1549995 | 11/1968 | France | 210/242.2 |
| 2428462 | 2/1980 | France | 210/242.2 |

Primary Examiner—Stanley S. Silverman
Assistant Examiner—Robert James Popovics
Attorney, Agent, or Firm—Michael J. Striker

[57] ABSTRACT

An apparatus for cleaning and aeration of open bodies of water includes a floating structure partially extending above a water surface and having at least one opening in its lower region through which, water flows into the apparatus, and a fan arranged in the upper region of the floating structure for creating vacuum that enables flow of water inside of the floating structure. An air receiving space is defined inside of the floating structure. A perforated plate which is located below a water surface established in the floating structure, limits the air receiving space from above. The air receiving space is connected with atmosphere by a gas conducting conduit.

11 Claims, 2 Drawing Sheets

APPARTUS FOR CLEANING AND AERATION OF OPEN BODIES OF WATER

BACKGROUND OF THE INVENTION

This invention relates to an apparatus for cleaning and aeration of open bodies of waters.

There exist apparatuses for cleaning ground waters at bottom layers in which a vacuum is created to cause air or gas to flow into ground water collected in a well shaft or a special housing (as disclosed in German documents DE-OS 36 25 488, DE-PS 38 05 200, DE-PS 38 11 962).

SUMMARY OF THE INVENTION

The object of the invention is an apparatus for cleaning and aeration of ground waters of open bodies of water.

The object of the invention is achieved by providing an apparatus that comprises a floating structure partially extending above a water surface and having a lower region with at least one opening through which, water flows into the apparatus; a fan for creating vacuum and arranged in the upper region of the floating structure; vertically adjustable means arranged inside the floating structure, defining an air receiving space and including a perforated plate which is located below a water surface established in the floating structure, and limits the air receiving space from above, and a gas conducting conduit connected with the air receiving space. Inner space inside the floating structure and above the air receiving space limiting perforated plate, forms cleaning and aeration portion of the apparatus. The vertical position of the perforated plate is so selected that the pressure inside the air receiving space is less than the atmospheric pressure, so that, upon creation of vacuum in the floating structure, air flows into the air receiving space and therefrom, through openings in the perforated plate, ascends into water which is above the perforated plate, in a form of minute bubbles. Instead of air, another processing gas can be used. However, the processing gas should be able to flow into the air or gas receiving space under pressure to insure an optimal effectiveness of the apparatus. With ascending bubbles, a pumping effect is achieved in the water region inside the floating structure. The pumping effect causes water circulation in the floating structure.

By appropriate selection of water inlet and outlet openings of the floating structure, an optimal effectivess and a quite laminar flow of water through the floating structure is achieved. The flow of water through the cleaning region of the floating structure is fostered by a ring arranged above the perforated plate in spaced relationship thereto and concentrically therewith, and/or by conducting water into the cleaning region through perforated tubes that extend through the air receiving space and the perforated plate. The ring causes water flow upward through the air stream and through the ring and downward flow of clean and therefore dense water outside the ring. The water flow through the floating structure is further facilitated by arranging water outlet openings radially with respect to the water inlet openings. The water flow is still further facilitated by connecting the radial water outlet opening with tubes extending into the body of water and lower ends of which are spaced a substantial distance from the bottom of the floating structure. At that, the distance of lower ends of tubes from the bottom of the floating structure may be different. This insures that the clean water having a temperature that is obtained inside the floating structure flows into deep layers of the body of water having a different temperature. The difference of the temperatures create an additional pulse for inflow of a water stream in the direction of water inlet openings of the floating structure. The means defining the air receiving space may be formed as a vertically or height self-adjustable floating body located in the floating structure. The air receiving space limiting perforated plate can be provided with a central opening connected with a gas conducting tube extending through the roof shaped plate of the floating structure and simultaneously serving for height adjustment of the air receiving space in the floating structure. An additional adjustment of the air receiving space can be conducted with respect to the bottom of the floating structure. In one embodiment, the air receiving space is formed in the upper portion of a tubular body which opens from beneath and in the lower portion of which a filter insert is located through which filter insert the water flows into the floating structure. In this case, the bottom of the floating structure has a central opening through which the tubular body extends.

The apparatus can be anchored to the water ground. Thereby cleaning and aeration of movable bodies of water is possible. The placement of the apparatus can be arbitrarily selected. Also, several such apparatuses can be used for simultaneous oxigenating of bodies of water and removal of impurities, i.e., such as phosphates, nitrates, or pesticides. Further, in the floating structure, additives can be added to the outflowing clean water to facilitate, i.e. phosphate precipitation.

The present invention both as to its construction so to its method of operation, together with additional objects and advantages thereof, will be best understood from the following detailed description of specific embodiments when read in connection with the accompanying drawings.

DETAILED DESCRIPTION OF THE PREFERRED EMBODIMENTS

Figure 1:
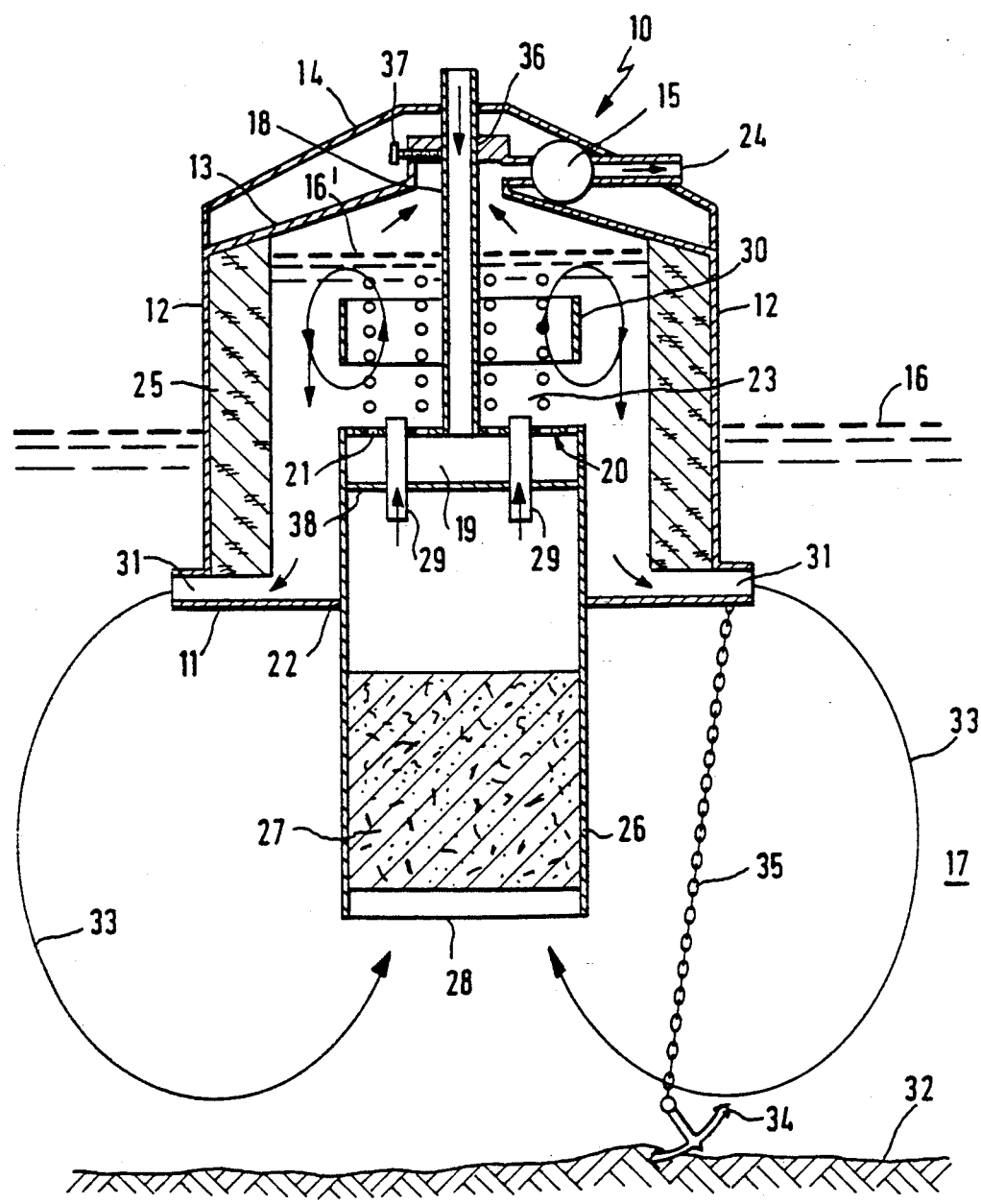
FIG. 1 shows an elevational cross-sectional view of a first embodiment of a cleaning and aeration apparatus according to the invention.

FIG. 1 shows a floating structure having a bottom 11, side walls 12, and an upper air-tight roof 13. A protective globe 14 is located above the roof 13 for protecting a fan 15 and other apparatuses (not shown), i.e. for supplying electrical power or air filters, from atmospheric conditions.

The floating structure is partially immersed under a water surface 16 of a relatively smooth body of water 17. Floating bodies 25 are arranged on inner surfaces of the side walls 12 of the floating structure 10 to insure that a larger portion of the floating structure 10 is above the water surface 16. Inside the floating structure 10, the water surface is at a higher level 16' due to suction action of the fan 15. A tubular body 26 extends axially through the bottom 11 of the floating structure 10. At its inner end, the tubular body 26 is closed with a perforated plate 20 that closes from above an air space 19 in the tubular body 26. A tube 18 extends from a central opening in the perforated plate 20. The tube 18 projects through an opening 36 in the roof 13 outside so that air or other gases from outside can flow into the air space 19. The air or other gases ascend from the air space 19 through perforated openings 21 in the perforated plate 20 into cleaning and aeration region 23 of the apparatus in a form of minute bubbles, as schematically shown in the drawings. The flow of air into the air space 19 is effected by the fan 15 which creates vacuum in the upper portion of the floating structure and absorbs air from the water surface 16' and conducts it through an outlet channel 24 outside. The outlet channel 24, however, may be connected to a filtering device.

The tubular body 26 together with the tube 18 is located in the floating structure 10 with a possibility of its height adjustment. The tubular body is secured at a desirable height with tightening screws 37 that engage the tube 18, only one screw 37 is shown in FIG. 1. In the lower portion of the tubular body 26, a filter insert 27 is located. The filter insert 27 is placed through a lower opening 28 of the tubular body 26. The water in the floating structure 10 flows therefrom through the filter insert 27, as shown by arrows, and to pipes 29 which extend through the air space 19 and project through the perforated plate 20 and a lower wall that limits the air space 19. In the cleaning and aeration region 23, the water is oxygenated and, at the same time, is freed from volatile impurities. A ring 30 is arranged above the perforated plate 20 concentrically with the tube 18 and is secured thereto with appropriate means, not shown. The water flows through the ring 30 up and outside the ring 30 down, as shown by arrows. The down flowing water flows to outlet openings 31 arranged at the bottom of the floating structure 10. Because of the vacuum inside of the floating structure 10, the water cools down and therefore moves downward and through the outlet openings 31 in a direction to the ground 32 and partially back to the suction region of the tubular body 26 as shown with arrows 33. The whole structure is anchored to the ground with an anchor 34 and a chain 35.

Figure 2:
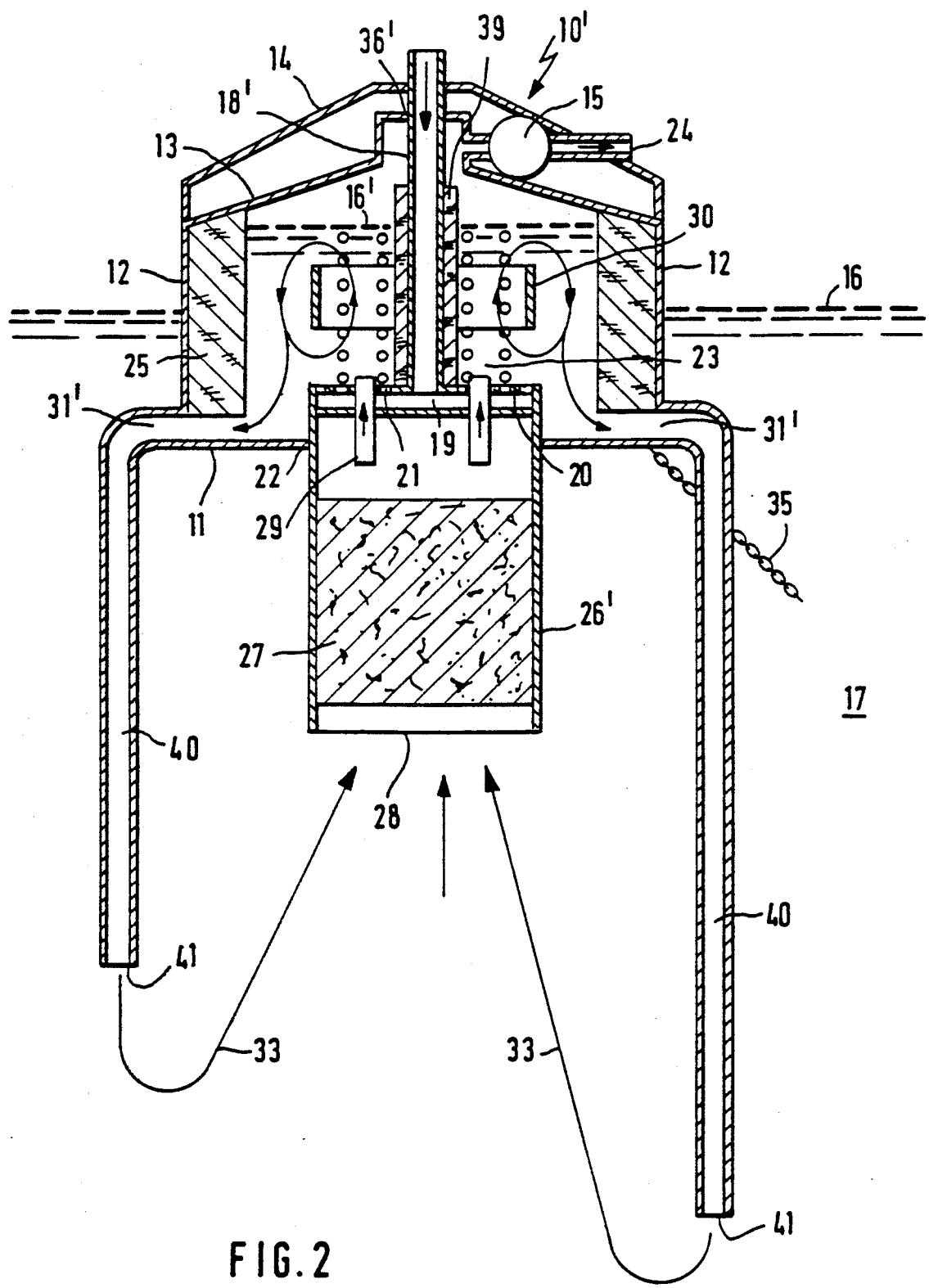
FIG. 2 shows the same view as FIG. 1 of a second embodiment of a cleaning and aeration apparatus according to the invention.

Another embodiment of the apparatus according to the invention is shown in FIG. 2 where unchanged identical elements are designated with the same reference numerals. The floating structure 10' of the embodiment shown in FIG. 2 differs from that shown in FIG. 1 in that the tubular body 26' is a floating body. To this end, the air tube 18' is provided with a buoyant sheathing 39, and the tubular body 26' and the air tube 18' are shiftable in the bottom opening 22 and opening 36' of the roof 13. Another difference consists in that the water outlet openings 31' have downward projecting tubes 40 attached thereto. The low openings 41 of tubes 40 are spaced from the bottom 11 at different distances. Through these tubes 40, the water flows back to deep layers of the body of water. The second embodiment of the apparatus of the invention is used for cleaning and aeration of more deep bodies of water.

While the invention has been illustrated and described as embodied in a cleaning and aeration apparatus, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

What is claimed is:

1. An apparatus for cleaning and aeration of open bodies of water, comprising a floating structure partially extending above a water surface and having a lower region with at least one opening through which, water flows into said apparatus, and an upper region; vertically adjustable means arranged inside said floating structure and defining an air receiving space, said air receiving space defining means including a perforated plate which is located below a water surface established in the floating structure, and limits the air receiving space from above; and a gas conducting conduit communicating with the air receiving space for an airflow into the air receiving space; a fan for creating vacuum and arranged in said upper region of said floating structure so that under the action of vacuum, air from the air receiving space passes through the perforated plate and water into a cleaning region located above the perforated plate and causes a water circulation back to the body of water.

2. An apparatus as set forth in claim 1, wherein said air receiving space defining means comprises a vertically self-adjustable floating body.

3. An apparatus as set forth in claim 1, wherein said nozzle plate has a central opening connected with said gas conducting conduit, said floating structure including a roof, and said gas conducting conduit extending through said roof.

4. An apparatus as set forth in claim 3, wherein said gas conducting conduit is fixedly connected with said roof.

5. An apparatus as set forth in claim 1, wherein said air receiving space defining means comprises a tubular body having an upper portion defining said air receiving space, said tubular body being open from beneath, and having a lower portion for receiving a filter insert.

6. An apparatus as set forth in claim 5, wherein said floating structure includes a bottom having a central opening through which said tubular body extends, and radially extending outlet means at said bottom for outflow of water from inside of said floating structure.

7. An apparatus as set forth in claim 6, further comprising downward extending tube means connected with said outlet means and having a lower end spaced a predetermined distance from said bottom.

8. An apparatus as set forth in claim 1, further comprising tube means extending through said air receiving space and said perforated plate for admitting water into said floating structure.

9. An apparatus as set forth in claim 1, further comprising a ring arranged above said perforated plate and in spaced relationship thereto for circulating water admitted inside of said floating structure.

10. An apparatus as set forth in claim 1, further comprising means for anchoring said floating structure to a water ground.

11. An apparatus for cleaning and aeration of open bodies of water, comprising a floating structure partially extending above a water surface and having a lower region with at least one opening through which, water flows into said apparatus, and an upper region; vertically adjustable means arranged inside said floating structure and defining an air receiving space, said air receiving space defining means including a perforated plate which is located below a water surface established in the floating structure, and limits the air receiving space from above; and a gas conducting conduit communicating with the air receiving space for an airflow into the air receiving space; a fan for creating vacuum and arranged in said upper region of said floating structure so that under the action of vacuum, air from the air receiving space passes through the perforated plate and water into a cleaning region located above the perforated plate and causes a water circulation back to the body of water, the air receiving space defining means comprising a tubular body having an upper portion defining said air receiving space, said tubular body being open from beneath and having a lower portion for receiving a filter insert, said floating structure including a bottom having a central opening through which said tubular body extends and radially extending outlet means at said bottom for outlet of water from inside of said floating structure; and a ring arranged above said perforated plate and in spaced relationship thereto for circulating water admitted inside said floating structure.

* * * * *